Figure 6:
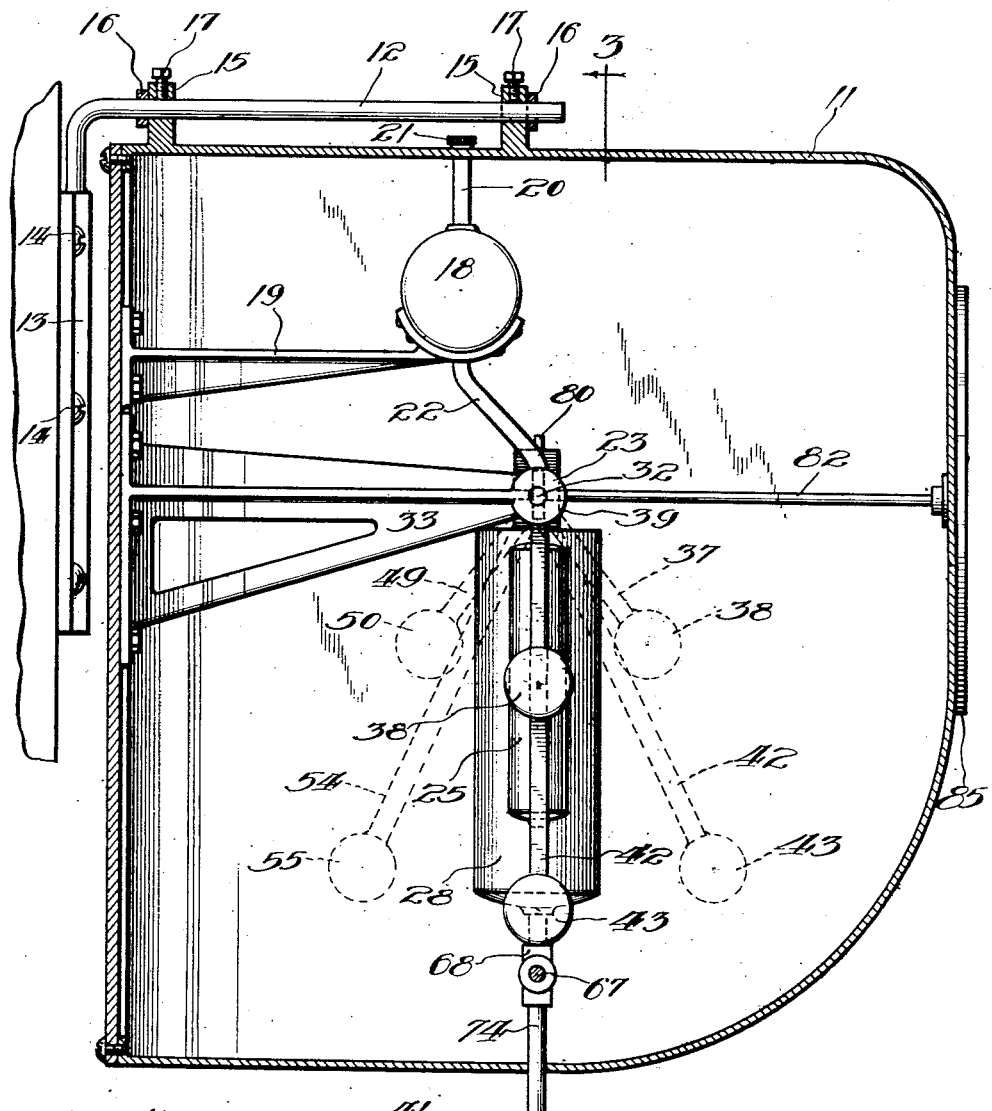

June 26, 1928.
C. H. GILL
SPEEDOMETER
1,674,776
Original Filed Feb. 25, 1924   3 Sheets-Sheet 1
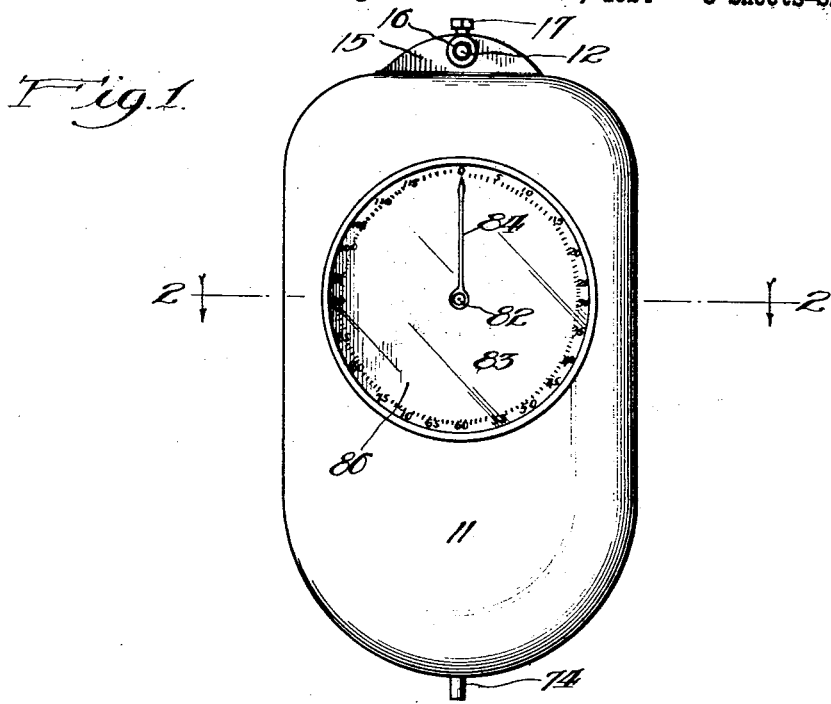
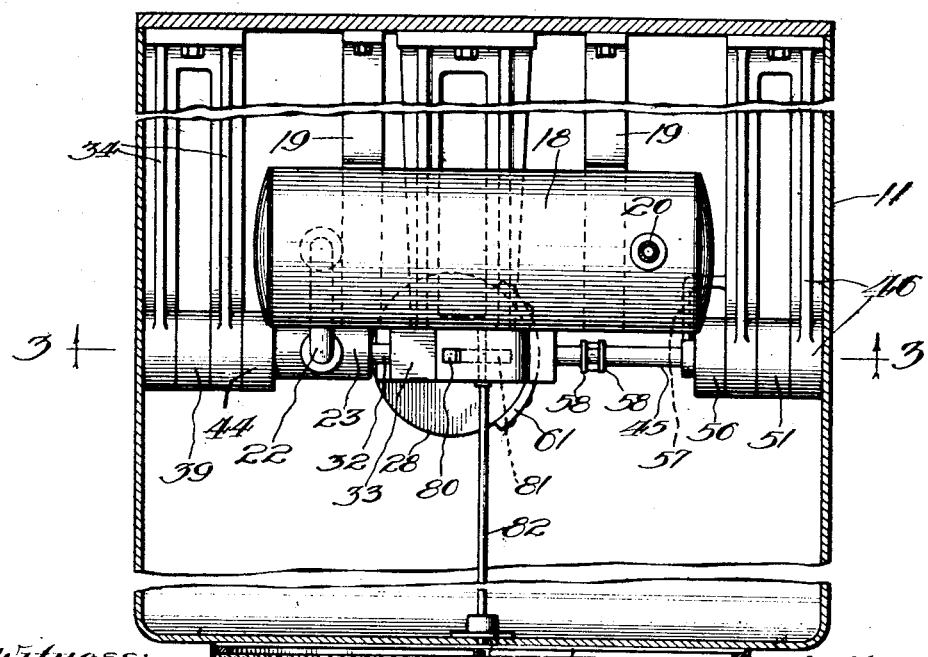

June 26, 1928.
C. H. GILL
1,674,776
SPEEDOMETER
Original Filed Feb. 25, 1924   3 Sheets-Sheet 2
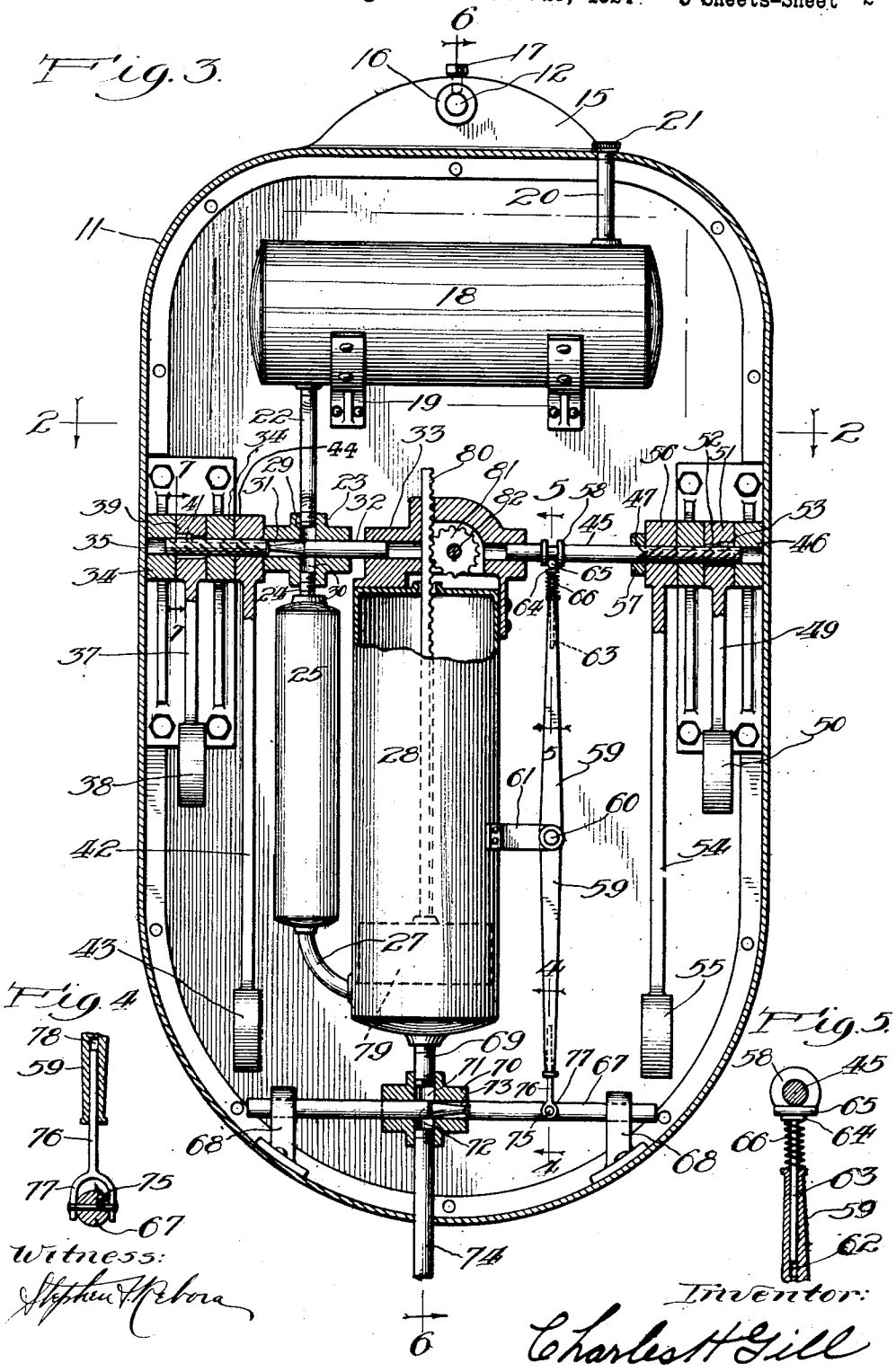

June 26, 1928.

C. H. GILL

SPEEDOMETER

Original Filed Feb. 25, 1924. 3 Sheets-Sheet 3

1,674,776

Witness:
Stephen H. Rebon

Inventor:
Charles H. Gill

Patented June 26, 1928.

1,674,776

UNITED STATES PATENT OFFICE.

CHARLES H. GILL, OF CHICAGO, ILLINOIS.

SPEEDOMETER.

Application filed February 25, 1924, Serial No. 694,988. Renewed November 30, 1927.

My invention relates to mechanism for continuously indicating the speed of travel of a vehicle whether upon the land, the water or in the air and, more particularly, for indicating the true rate of travel, with reference to the solid surface of the earth, of water and air vehicles.

While mechanism for indicating the rate of travel of water and air vehicles or vessels relative to the medium they travel through or upon are old in the art there has been no method discovered heretofore for actuating a mechanism carried by the water or air vehicle to indicate the true rate of travel of such vehicle relative to the solid crust of the earth. Thus, the driver of any air-craft does not now know the true travel rate of his craft although he may be provided with existing apparatus for indicating its travel speed relative to the atmosphere. Since, however, the air itself is almost constantly in motion in one direction or another and at varying rates of speed, the rate of travel of the craft relative to the air and its rate of travel relative to the earth are usually so much at variance as to make such indicating mechanism of little value for indicating rate of progress from one point to another.

In the same manner, while there exist various devices for indicating the speed of travel of vessels upon the water relative to the water, there is no method for indicating their true rate of progress and, since currents exist in many parts of the oceans and in all streams so that the water itself is in motion, the speed of a vessel relative to the water and its true rate of progress may be greatly at variance.

My invention provides means for indicating the true rate of travel of vehicles irrespective of the medium they travel upon or through, being governed entirely by the force of gravity and not being actuated by or having any operative connection with the medium travelled upon or through. It might be carried in the hand of a pedestrian or upon the lap of a passenger in a boat, automobile or aeroplane and would indicate the rate of travel of that pedestrian or passenger.

I am aware that apparatus governed by gravity has been previously devised for indicating rates of acceleration or of retardation and that apparatus has even been designed for totalling the accelerative and retardative impulses, but I am not aware that there has ever before been devised a means for recording and indicating accurately the duration, as well as the degree of such impulses, and for automatically computing the total acceleration or retardation and indicating the excess of acceleration over the retardation as the true travel speed.

The objects of my invention are, first, to provide pendulum means adapted to measure the degree of each accelerative impulse; second, to provide means to nullify movements or portions of motions made by said pendulum means responsive to direct gravitational action so that only such movements or portions of movements due to acceleration will be measured; third, to provide means for measuring the duration of each degree of acceleration; fourth, to provide means for multiplying the degree of acceleration by the duration of that degree of acceleration; fifth, to provide means for totalling the products of such multiplications; sixth, to provide pendulum means adapted to measure the degree of each retardative impulse; seventh, to provide means to nullify movements or portions of movements made by said pendulum means responsive to direct gravitational action so that only such movements or portions of movements due to retardation will be measured; eighth, to provide means for measuring the duration of each degree of retardation; ninth, to provide means for multiplying the degree of retardation by the duration of that degree of retardation; tenth, to provide means for subtracting the products of such last mentioned multiplications from the total of acceleration; and, eleventh, to provide means for continuously indicating, as true travel speed, the excess of total acceleration over the total of retardation, if any.

I attain these objects and others as may hereinafter appear, by means of the mechanism illustrated in the accompanying drawings, in which—

Figure 7:
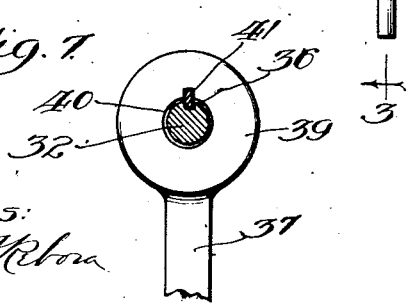

Figure 1 is a reduced front elevation of the whole device in its casing; Figure 2 is a plan section taken on the line 2—2 of Figure 1, being shown partly broken away and contracted to save space; Figure 3 is a section taken on the line 3—3 of Figures 2 and 6; Figure 4 is an enlarged detail section taken on the line 4—4 of Figure 3; Figure 5 is an enlarged detail section taken on the line 5—5 of Figure 3; Figure 6 is a reduced section taken on the line 6—6 of Figure 3; and Figure 7 is an enlarged detail view taken on the line 7—7 of Figure 3.

Similar numerals refer to similar parts throughout the several views.

A casing 11 is suspended, in my preferred construction, from a rod 12 forming a right angular projection from a bracket 13 which bracket 13 may be secured to any suitable portion of the vehicle by means of screws 14. The casing 11 is provided with integral projections 15 having openings through which the rod 12 passes, thus hingably suspending the casing 11. Collars 16 on the rod 12 prevent longitudinal movement of the casing 11 on the rod 12. Set screws 17 in the projections 15 are adapted to bear against the rod 12 and prevent swinging of the casing 11 when such swinging is not desirable. It should be noted that the suspension of the device, as just described, is not essential to its proper operation in all cases but is very desirable when it is used upon an aeroplane which may be turned upside down at times. It is not essential that the device should be secured to the vehicle at all, in the case of its use upon an automobile or other land vehicle or water vessel.

A tank 18 is secured within and to the casing 11 by means of brackets 19 secured to the casing 11 and projecting therefrom. A pipe 20 leads into the tank 18, passing through the casing 11, and is provided with a covering screw-cap 21.

A pipe 22 opens into the under side of the tank 18 and leads therefrom into a valve 23 and a shorter pipe 24 leads from the valve 23 into a cylinder 25. A pipe 27 leads from the lower end of the tank 25 to a larger tank 28 into which it opens near the base of the tank 28.

The valve 23 consists of a casing provided with an inlet port 29 and an outlet port 30 and has a circular opening 31 passing entirely through its casing and with the inlet port 29 and outlet port 30 opening into the circular opening 31. A shaft 32 is rotatably and slidably journaled in a bracket 33 and in a bracket 34. Both the brackets 33 and 34 are secured to and project from the casing 11 and the bracket 33 also supports in position the tank 28. The shaft 32 passes through the circular opening 31 in the valve 23 and one portion of the shaft 32 fits into the circular opening 31 so snugly as to provide a substantially water-tight fit and another portion of the shaft 32 is fashioned to a conical shape. Another portion of the shaft 32 is provided with screw threads 35 and with a keyway 36.

A pendulum 37 is provided with a weight 38 and with an upper portion 39 provided with a circular opening 40 through which the threaded portion of the shaft 32 passes. A key 41 is set in the portion 39 and engages with the keyway 36, cut through and below the threads 35 in the shaft 32, thus permitting the shaft 32 to slide longitudinally through the opening 40 but locking the shaft 32 to the portion 39 for rotation therewith. A longer pendulum 42 is provided with a weight 43 and has an upper portion 44 provided with an internally threaded opening therethrough through which the threaded portion of the shaft 32 passes in screw engagement with the internal threads thereof.

A shaft 45 is rotatably and slidably journaled in the bracket 33 and in a bracket 46 secured to and projecting from the casing 11 and a portion of the shaft 45 is provided with screw threads 47 and with a keyway cut through and below the threads 47 in the shaft 45. A pendulum 49 of the same length as the pendulum 37 is provided with a weight 50 and with an upper portion 51 provided with a circular opening 52 through which the threaded portion of the shaft 45 passes. A key 53 is set in the circular opening 52 to engage with the keyway in the shaft 45, thus allowing longitudinal sliding movement of the shaft 45 through the circular opening 52 but locking the shaft 45 to the portion 51 of the pendulum 49 for rotation therewith. A pendulum 54 of the same length as the pendulum 42 is provided with a weight 55 and has an upper portion 56 provided with an internally threaded opening therethrough through which the threaded portion of the shaft 45 passes in screw engagement with the internal threads thereof. The bracket 46 is provided with an arm 57 and the shaft 45 passes through a circular opening therein, the arm 57 preventing longitudinal movement of the pendulum portion 56 on the shaft 45.

The shaft 45 carries two collars 58 secured thereon and spaced apart to form a circular channel. A lever 59 is pivoted at its center by means of a pin 60 upon a bracket 61 secured to and extending from the tank 28. The lever 59 has an opening 62 bored longitudinally therein from its upper end and a shaft 63 is mounted to telescope therein. The shaft 63 carries a fixed collar 64 and cylindrical member 65 secured thereon and adapted to fit snugly into the channel in the shaft 45 formed by the collars 58. A helical spring 66 urges the cylindrical member 65 into contact with the shaft 45.

A shaft 67 is slidably mounted in brackets 68 secured to and projecting from the casing 11. A pipe 69 leads from the bottom of the tank 28 and into a valve casing 70. The valve casing 70 is provided with an inlet port 71 and an outlet port 72 and has a circular opening 73 passing therethrough at right angles to the inlet and outlet ports 71 and 72 which open into the circular opening 73. All of the shaft 67 is of such diameter as to fit snugly but slidably in the opening 73 except one portion of the shaft 67 which is fashioned to a conical shape. An outlet pipe 74 leads from the outlet port 72 through the casing 11 for spillage.

The shaft 67 has a pin 75 passed through it at right angles thereto and with the ends of the pin 75 projecting. A rod 76 has a bifurcated portion 77 which straddles the shaft 67, and the ends of the pin 75 pass through circular openings in the arms of the bifurcated portion 77. The lower end of the lever 59 has an opening 78 drilled therein longitudinally thereof in which the rod 76 telescopes.

The valves 23 and 70 consist of cylindrical chambers 31 and 73 respectively having inlet ports 29 and 71 and outlet ports 30 and 72 respectively, each outlet port being opposite its respective inlet port. Portions of the shafts 32 and 67 act as valve cores and these portions will be referred to as valve cores. These valve cores, which are best shown in Figure 3, have portions thereof substantially of the same diameter as the chambers 31 and 73 respectively and when these portions cover the inlet and outlet ports completely no fluid is permitted to pass from inlet to outlet ports. Each of the valve cores, however, has also a conically shaped portion with the base of the cones toward the directions of movement of the valve cores in opening the valves. The pitch of the conical portions or the inclinations of their sides depend upon the construction of other parts but must be such that the volume of liquid permitted to pass around the conical portions from inlet to outlet valve at any position of said conical portions relative to said ports is proportional to the excess distances of lift of the pendula weights 38 or 50 over the distances of lift of the pendula weights 43 or 55 in swinging to actuate the said valve cores to such position.

The tank 28 is provided with a float 79 movable longitudinally thereof and therein and the float 79 carries a rack 80 which engages a pinion 81 secured upon a shaft 82 journaled in the bracket 33 and in the casing 11. A dial 83 is secured to the outside of the casing 11 and the shaft 82 passes through the exact center of the dial 83 and carries an indicating hand 84 which is adapted to designate graduations upon the dial 83. A flange 85 is secured to the casing 11 and secures in position a circular glass plate 86 which is so held as not to interfere with the free movement of the indicator 84.

In operation, my speedometer as a whole conforms to the vertical in one plane by swinging upon the rod 12 of the bracket 13 unless it should be desirable to hold it stationary by tightening the said screws 17, as when the device is used upon a land vehicle and it is desired to avoid the swing of the device back and forth even at the cost of some loss of accuracy. The pendula 37, 42, 49 and 54 swing together to conform to the vertical in their plane of travel. Primary movement of the pendula to the left, as shown dotted in Figure 6, is caused by acceleration and primary movement to the right by deceleration.

The tank 18 is filled with water, oil or other fluid through the pipe 20 and this fluid will tend to flow from the tank 18 through the pipe 22 and valve 23 to the cylinder 25, pipe 27 and tank 28 but is almost entirely blocked in the valve 23 by the shaft 32 which normally almost closes the inlet port 29 and the outlet port 30. The normal position of the conical portion of the shaft 32 is however such that a very small amount of fluid is allowed to pass and it is obvious that movement of the shaft 32 to the right in Figure 3 will open the valve further and will progressively open it to greater extent proportionately to the movement of the shaft 32 the further the shaft 32 is carried to the right.

Assuming the vehicle this speedometer is to be used upon to be starting from rest, the first acceleration will cause all of the pendula to swing in the direction opposite to the direction of acceleration, the two shorter pendula 37 and 49 swinging through a greater number of degrees than the longer pendula 42 and 54. Hence, the shaft 32 will be rotated further than the internally threaded portion 44 will be and there will consequently be a sliding movement of the shaft 32 toward the right in Figure 3 due to the spiralling motion of the screw threads of the shaft in the internally threaded portion 44 of the pendulum 42.

This movement of the shaft 32 further opens the valve 23, as heretofore described, and permits fluid from the tank 18 to pass through the pipe 22 and valve 23 to the cylinder 25 and, through the pipe 27, to the tank 28 in proportion to the size of the passageway through the valve 23. The excess in the degree of swing of the pendulum 49 over the swing of the pendulum 54, occurring at the same time as the excess swing of the pendulum 37 over the swing of the pendulum 42, will operate the shaft 45 in the same manner as described for the shaft 32 except that the movement of the shaft 45 will be to the left in Figure 3 and will swing the lever 59 on its pivot 60 to draw the shaft 67 toward the right in Figure 3. This movement of the shaft 67 to the right will further close the inlet port 71 and outlet port 72 of the valve casing 70 and, hence, no fluid will then be permitted to pass through that valve. It should be stated here that normally there is identically the same small amount of flow permitted through the valve casing 70 as through the valve 23.

The fluid passing into the tank 28 causes the float 79 to rise and the rack 80 to rotate the pinion 81 and the shaft 82 carrying the indicator 84. As long as the acceleration of the vehicle continues at the same rate the pendulums will all maintain their respective degrees of swing but as acceleration ceases all of the pendulums will again seek their normal vertical positions and their return to the vertical will slide the shaft 32 to the left in Figure 3 to its normal position and the shaft 67 to its normal position.

Deacceleration of the vehicle will result in all of the pendulums swinging forwardly, the pendulums, 37 and 49, however, swinging a greater number of degrees than the pendulums 42 and 54. The action differs from the swings of the pendulums under acceleration only in the direction of swing and in that the shaft 32 is now moved toward the left in Fig. 3, further closing the valve 23, and the shaft 67 is moved to the left, progressively opening the passage through the valve casing 70 and allowing fluid to pass from the tank 28 through the pipe 69, valve casing 70, and pipe 74 to without the casing 11. This loss of fluid from the tank 28 causes the float 79 and rack 80 to move downwardly and the pinion 81, shaft 82 and indicator 84 to move in the opposite direction to that moved in under acceleration.

Since the degrees of swing of the pendulum 37 over the degrees of swing of the pendulum 42 measures the intensity of acceleration, and since the volume of fluid passing through the valve 23 measures the intensity of acceleration multiplied by its duration, and the total volume of fluid contained in tank 28 at any time represents the total excess of acceleration over the total of deacceleration, it will be evident that the position of the indicator 84 with reference to graduations on the dial 83 will continuously indicate the travel speed of the vehicle.

Since the degrees of swing of the pendulums are not directly proportional to the degrees of acceleration or deacceleration but become progressively less as each further degree of swing from the vertical requires a longer lift of the pendulum weight against gravity, I employ the conical shaft portions as valve-cores to compensate for this. In order that even the slightest acceleration or deacceleration may be operative in this speedometer, I allow a small normal flow of fluid through each of the valves to avoid the loss which would otherwise be unavoidable while the valve-cores were moving from a fully closed position.

It will be evident that numerous departures from the specific construction herein described and illustrated might be made without departing from the spirit of my invention. I desire therefore to be limited as to the scope of this invention only by the limitations imposed by the prior state of the art and by the following claims.

I claim:

1. In speedometers, the combination of a support, pendula pivoted upon said support, and means controlled by differences in the degrees of swing of the said pendula for continuously indicating the travel speed of the said support.

2. In speedometers, the combination of a support, pendula of unequal length pivoted upon said support, and means controlled by differences in the swing of said pendula for continuously indicating the travel speed of said support.

3. In speedometers, the combination of a support, pendula of unequal length pivoted upon said support, and means controlled by differences in the swing of said pendula responsive to inertia for continuously indicating the travel speed of said support.

4. In speedometers, the combination of a support, pendula of unequal length pivoted upon said support, and means controlled by differences in the degrees of swing of one of said pendula over the degrees of swing of the other of said pendula responsive to inertia for continuously indicating the travel speed of said support.

5. In speedometers, the combination of a support, pendula controlled means for measuring degrees of acceleration and deceleration of said support, means controlled by said pendula controlled means and adapted to measure the excess of total acceleration of said support over the total of deceleration of said support, and means controlled by said last named means and adapted to continuously indicate, in terms of distance per time period, the travel speed of said support.

6. In speedometers, the combination of a support, means responsive to inertia carried by said support and adapted to measure acceleration and deceleration of said support, measuring means controlled by said last named means and adapted to measure the excess of total acceleration of said support over the total of deceleration of said support, and an indicator controlled by said measuring means and adapted to indicate continuously the travel speed of said support.

7. In speedometers, the combination of pendula responsive to inertia, a support carrying said pendula, measuring means adapted to measure the degrees and durations of displacements of said pendula from the vertical, and indicating mechanism controlled by said measuring means and adapted to continuously indicate the travel speed of said support.

8. In speedometers, the combination of a support, pendula of unequal length pivoted upon said support, measuring means adapted to measure the degrees and durations of excesses of displacements from the vertical of certain of said pendula over the displacements of certain other of said pendula, and an indicator controlled by said measuring means and adapted to continuously indicate the travel speed of said support.

9. In speedometers, the combination of a support, a threaded shaft, an internally threaded member upon said shaft in screw engagement therewith, a pendulum secured to said shaft, a pendulum secured to said internally threaded member, and means controlled by the longitudinal movements of said shaft responsive to differences in the degrees of swing of said pendula for indicating the travel speed of said support.

10. In speedometers, the combination of a support, a threaded shaft rotatably and slidably mounted in said support, an internally threaded member upon said shaft in screw engagement with the said threads thereof, means adapted to prevent longitudinal movement of said member with said shaft, a member splined upon said shaft, means adapted to prevent longitudinal movement of said last named member with said shaft, a pendulum secured to and depending from said internally threaded member, a second pendulum of unequal length to the other said pendulum secured to and depending from said splined member, and means controlled by longitudinal movements of said shaft for indicating the travel speed of said support.

11. In speedometers, the combination of a support, a threaded shaft rotatably and slidably mounted in said support, an internally threaded member upon said shaft in screw engagement with the threads thereon, an element splined upon said shaft, means adapted to prevent longitudinal movement with said shaft of said member and said element, pendula of unequal length secured to and depending from said member and said element respectively, measuring means adapted to measure the degrees and durations of excesses of displacements from the vertical of certain of said pendula over the displacements of certain other of said pendula, and means controlled by said measuring means and by longitudinal movements of said shaft for indicating the travel speed of said support.

12. In speedometers, the combination of a support, a threaded shaft rotatably and slidably mounted in said support, an internally threaded member upon said shaft in screw engagement with the threads thereon, an element splined upon said shaft, means adapted to prevent longitudinal movement of said member and said element with said shaft, pendula of unequal length secured respectively to and depending from said member and said element, a tank, an inlet valve for said tank openable by longitudinal movement of said shaft in one direction and closable by longitudinal movement of said shaft in opposite direction, a fluid adapted to flow into said tank through said inlet valve in volume depending upon the degree and duration of opening of said inlet valve, a second threaded shaft rotatably and slidably mounted in said support, a second internally threaded member upon said second shaft in screw engagement with the threads thereon, a second element splined upon said second shaft, means adapted to prevent longitudinal movement of said second member and said second element with said second shaft, pendula of unequal length secured respectively to and depending from said second member and said second element, an outlet valve for said tank openable by longitudinal movement of said second shaft in one direction and closable by longitudinal movement of said second shaft in opposite direction and adapted to permit the said fluid to flow from the said tank in volume depending upon the degree and duration of opening of said outlet valve, and means controlled by the excess of fluid entering said tank through said inlet valve over the volume of fluid escaping from said tank through the said outlet valve for indicating the travel speed of said support.

13. In speedometers, the combination of a tank, an inlet valve for said tank adapted to admit a fluid into said tank in volume depending upon the degree and duration of opening of said inlet valve, inertia means adapted to open said inlet valve proportionately to degrees of acceleration, an outlet valve for said tank adapted to allow the escape of fluid from said tank in volume depending upon the degree and duration of opening of said outlet valve, inertia means adapted to open said outlet valve proportionately to degrees of deceleration, and means controlled by the volume of fluid held by said tank for indicating travel speed.

14. In speedometers, the combination of a support, a tank carried by said support, an inlet valve for said tank having a core of substantially conical form and adapted to admit a fluid into said tank in volume depending upon the degree and duration of opening of said inlet valve, inertia controlled means adapted to open said inlet valve proportionately to degrees of acceleration of said support, an outlet valve for said tank having a core of substantially conical form and adapted to allow the escape of fluid from said tank in volume depending upon the degree and duration of opening of said outlet valve, inertia controlled means adapted to open said outlet valve proportionately to degrees of deceleration of said support, and means controlled by the volume of fluid held by said tank for indicating travel speed.

15. In speedometers, the combination of a support, two pairs of pendula pivoted upon said support to swing in the line of travel of the support, one of each pair being shorter than the other pendulum of that pair, and means controlled by the extent and duration of the excess of displacements from normal position of the said shorter pendula over the displacements from normal position of the longer pendula for indicating the speed of travel of the said support.

16. In speedometers, the combination of a tank having inlet and outlet valves, an inertia operated element adapted to open the said inlet valve proportionately to the acceleration of the vehicle carrying said speedometer and to allow an amount of fluid proportional to the degree and duration of acceleration of the said vehicle to flow into the said tank, a second inertia operated element adapted to open the said outlet valve proportionately to the retardation of the said vehicle and to allow an amount of fluid proportional to the degree and duration of retardation of the said vehicle to flow from the said tank, a movable member adapted to have its movements, both as to direction and extent, controlled by the quantity of fluid in the said tank, and an indicating member controlled by the movements of the said movable member.

17. In speedometers, the combination of a tank having inlet and outlet valves, each of which valves is normally slightly open so that a small quantity of fluid passes constantly into the said tank through the said inlet valve and from the said tank through the said outlet valve, a pendulum member adapted to swing in the line of movement of the vehicle carrying said speedometer and adapted to open the said inlet valve by its swing in one direction from the vertical so as to allow a quantity of fluid proportional to the degree and duration of acceleration of the vehicle to pass into the said tank, in addition to the quantity normally so passing therein, a second pendulum member adapted to swing in the line of movement of the said vehicle and adapted to open the said outlet valve by its swing in one direction from the vertical so as to allow a quantity of fluid proportional to the degree and duration of retardation of the said vehicle to pass from the said tank, in addition to the quantity normally so passing therefrom, and means controlled by the quantity of fluid in the said tank for indicating the speed of travel of the said vehicle.

18. In speedometers for vehicles, the combination of a tank having inlet and outlet valves, each of which valves is normally slightly open so that a small quantity of fluid passes constantly into the said tank through the said inlet valve and from the said tank through the said outlet valve, two pairs of pendulum members adapted to swing in the line of movement of the vehicle, each pair consisting of a short and a long pendulum member, means adapting the excess of swing of one short pendulum member in one direction over the swing of its complementary long pendulum member in like direction to open the said inlet valve by its swing so as to allow a quantity of fluid proportional to the degree and duration of acceleration of the vehicle to pass into the said tank, in addition to the quantity normally so passing therein, means adapting the excess of swing of one short pendulum member in one direction over the swing of its complementary long pendulum member in like direction to open the said outlet valve by its swing so as to allow a quantity of fluid proportional to the degree and duration of retardation of the said vehicle to pass from the said tank, in addition to the quantity normally so passing therefrom, and a travel-speed indicating member controlled by the volume of fluid contained in said tank.

19. In speedometers, the combination of a valve casing, an inlet port in said casing, an outlet port in said casing, a slidable valve-core interposed between said ports, a conical portion of said core, inertia operated pendula, and means controlled by the degrees of swing of said pendula relative to each other for moving the said valve-core longitudinally in and through said valve casing in direction controlled by and extent proportional to the direction of swing of said pendula and to the excess of degrees of swing of one of said pendula over the other of said pendula.

20. In speedometers, the combination of a threaded shaft, an internally threaded member on said shaft in screw engagement therewith, a pendulum secured to said member, another pendulum of unlike length secured upon said shaft to rotate said shaft, means controlled by the longitudinal movements of said shaft caused by differences in the degrees of swing of the said pendula responsive to inertia for measuring acceleration or deceleration.

CHARLES H. GILL.